United States Patent
Joshi et al.

(10) Patent No.: US 12,470,398 B2
(45) Date of Patent: Nov. 11, 2025

(54) SYSTEM AND METHOD FOR REDUCING AUTHENTICATION DELAYS RELATED TO SECURITY MODULE PROCESSING

(71) Applicant: Capital One Services, LLC, McLean, VA (US)

(72) Inventors: Rohit Joshi, Glen Allen, VA (US); Swapna Mandala, McLean, VA (US); Vishal Parikh, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 594 days.

(21) Appl. No.: 17/668,317

(22) Filed: Feb. 9, 2022

(65) Prior Publication Data
US 2023/0254153 A1    Aug. 10, 2023

(51) Int. Cl.
*H04L 9/32*    (2006.01)

(52) U.S. Cl.
CPC .......... *H04L 9/3242* (2013.01); *H04L 9/3226* (2013.01)

(58) Field of Classification Search
CPC ............................ H04L 9/3242; H04L 9/3226
See application file for complete search history.

(56) References Cited

U.S. PATENT DOCUMENTS

| | | | |
|---|---|---|---|
| 11,570,180 B1* | 1/2023 | Fitzpatrick | H04L 9/0643 |
| 11,606,210 B1* | 3/2023 | Madden | H04L 63/10 |
| 2005/0268099 A1* | 12/2005 | Cusey | B41J 2/17546 |
| | | | 713/168 |
| 2021/0409199 A1* | 12/2021 | Tsirkin | H04L 9/3226 |
| 2022/0385649 A1* | 12/2022 | Basu | H04L 63/20 |

* cited by examiner

*Primary Examiner* — Joseph L Greene
(74) *Attorney, Agent, or Firm* — Foley & Lardner LLP

(57) ABSTRACT

In some embodiments, reducing authentication delays related to security module processing may be facilitated. In some embodiments, a first authentication code may be generated based on a first verification code associated with an account. The first authentication code may be stored in association with the account. An authentication request may be obtained to authenticate an action, and the authentication request may comprise a second verification code. A security module request may be generated for a security module response related to the second verification code. A second authentication code may be generated based on the second verification code. Based on a determination that the second authentication code corresponds to the first authentication code, an authentication response for the authentication request may be provided.

20 Claims, 5 Drawing Sheets

300

SYSTEM AND METHOD FOR REDUCING AUTHENTICATION DELAYS RELATED TO SECURITY MODULE PROCESSING

BACKGROUND

Conventional systems rely on various cryptographic algorithms to verify the authenticity of data. Many of these conventional systems rely on hardware security modules (HSMs) (e.g., on-premises or cloud-based HSMs) or performance-limited security modules to perform secure authentication of such data, which may lead to a negative user experience due to such security module limitations. For example, the use of HSMs is limited by processing power and availability, which may not be suitable for high-speed and high-volume data authentication and may negatively impact the user experience.

SUMMARY

Methods and systems are described herein for improvements related to reducing authentication delays related to security module processing. As one example, methods and systems are described herein for detecting security module delays and performing delay-triggered hash-based message authentication code (HMAC) data authentication. As discussed above, many conventional systems rely on HSMs or performance-limited security modules to perform secure authentication of such data, which may lead to a negative user experience due to such security module limitations. In some embodiments, in scenarios where HSMs or performance-limited security modules must remain a primary authentication component, a pre-generated authentication code (e.g., HMAC) derived from an HSM-generated verification code (or other security-module-generated verification code) may be used as part of an alternative security technique to perform data authentication upon detecting or anticipating an HSM-related delay.

In one scenario, a user's account credentials may need to be authenticated in a timely manner. For example, a user may provide an authentication request to a computing system to authenticate the user's login credentials. The authentication request may include an account identifier (e.g., a username, screenname, alphanumeric value, etc.), a verification value (e.g., verification code, password, passphrase, etc.), or other information (e.g., expiration date of the account, creation date of the account, location information, a cryptographic key, a public key, etc.). The system may generate a security module request to authenticate the user to determine whether to allow a user to access content, perform one or more account-related actions, or otherwise gain access to the user's account. In some instances, due to a large volume of users also attempting to log into the system, an HSM may not be currently available to generate a corresponding verification value for comparison against the verification value in the user's authentication request, thereby causing the user frustration while attempting to gain access to their account because the security module is unavailable to authenticate the user. Based on such delay, the system may instead authenticate the user by (i) using an HMAC function and the authentication request information to generate an authentication code, (ii) retrieving a prior HMAC-generated authentication code (e.g., derived from an HSM-generated verification code and stored in association with the user's account identifier), and (iii) comparing the generated authentication code to the prior HMAC-generated authentication code. In this way, for example, the system may reduce authentication delays associated with security module processing.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
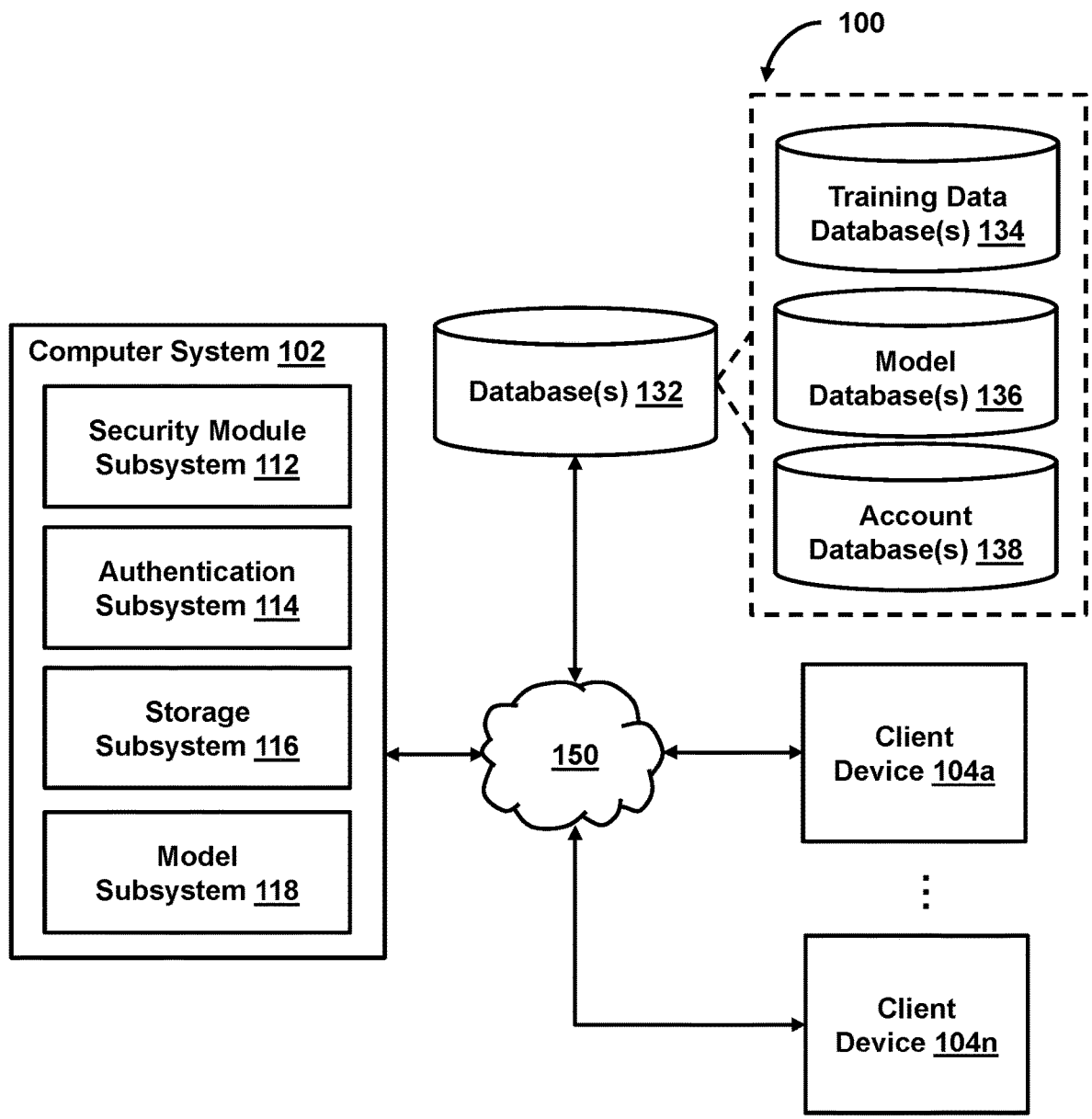
FIG. 1 shows a system for reducing authentication delays, in accordance with one or more embodiments.

FIG. 1 shows a system 100 for reducing authentication delays, in accordance with one or more embodiments. As shown in FIG. 1, system 100 may include computer system 102, client device 104 (or client devices 104a-104n), or other components. Computer system 102 may include security module subsystem 112, authentication subsystem 114, storage subsystem 116, model subsystem 118, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may generate and store a first authentication code in association with an account for processing one or more future authentication requests related to the account. As an example, the stored authentication code may be generated based on a first verification code associated with the account (e.g., an HSM-generated verification code for the account), and system 100 may later retrieve the stored authentication code to process a request to authenticate an action related to the account. For example, if the authentication request includes a second verification code, system 100 may generate a second authentication code based on the second verification code and provide an authentication response for the authentication request based on a determination that the second authentication code corresponds to the first authentication code. In one use case, if the second authentication code matches the first authentication code (e.g., the two codes are the same), the authentication response may include an indication that the requested action is authenticated (e.g., indicating that the requested action is valid and should be allowed). In another use case, if the second authentication code does not match the authentication code (e.g., the two codes are different), the authentication response may include an indication that the requested action is not authenticated (e.g., indicating that the requested action is invalid and should be declined).

As an example, the foregoing verification codes may each be a secret associated with the account for verification/authentication purposes. The foregoing authentication codes may each be generated based on the respective verification code or other information (e.g., account-related information, an account identifier, expiration date of the account, creation date of the account, a password, a passphrase, a pin code, etc.). In one use case, such a verification code may be a code that an account service provider has issued to a user and is associated with an account to verify the identity of a user. To keep the verification code secure, the account service provider may not store the verification code on its system. For instance, the account service provider may be bound by one or more regulations or other authorities with which the storage of the verification code would be non-compliant. Therefore, in some embodiments, system 100 may generate an authentication code based on the verification code and store the authentication code in association with the account. In this way, for example, the account service provider may remain compliant because the account issuer is not storing the verification code, but rather the authentication code.

In some embodiments, subsequent to storing an authentication code in association with an account, system 100 may obtain an authentication request to authenticate an action associated with the account, where the authentication request includes an identifier and a verification code. As part of the authentication process, system 100 may generate a security module request for a security module response (e.g., to obtain an account-associated verification code from the security module for comparison with the verification code in the authentication request). If the security module is unavailable to handle the security module request (e.g., to provide the account-associated verification code) or such response from the security module is delayed, system 100 may compare an authentication code (e.g., generated from the identifier and the verification code in the authentication request) to the stored account-associated authentication code to authenticate the requested action. As an example, in response to determining that a delay related to the security module response satisfies a delay threshold, system 100 may compare the derived authentication code to the stored account-associated authentication code to determine whether there is a match between the authentication codes. If the authentication codes match, system 100 may provide an authentication response indicating that the requested action is authenticated. In this way, for example, the system may reduce authentication delays associated with security module processing.

Subsystems 112-118

To provide secure authentication of account-related information, account-related actions, or other account-related events, a security module may be used to generate an account-associated verification code as a comparison against a verification code in an authentication request. For example, an account service provider may require a verification code for a user to gain access to account-related information, authenticate account-related actions, or authenticate account-related events. For example, account-related information may include an account identifier (e.g., a username, a screenname, the name of a user, an integer, an alphanumeric string, a hexadecimal string, binary values, or other account identifier), an account password (e.g., a pincode, passphrase, a geometric shape, biometric data, etc.), a name of an account owner, location information of an account owner (e.g., city, state, zip code, postal code, address, GPS coordinates, or other location information), contact information (e.g., a phone number, fax number, pager number, email address, etc.), an expiration date of the account (e.g., a date on which the account ends service, a validity end date, etc.), an account-related balance (e.g., a monetary balance, a crypto-currency balance, an asset balance, etc.), a service code (e.g., a code that recognizes which services the account is entitled to), or other account-related information. As another example, an account-related action may include a login attempt, a payment transaction (e.g., to use the account to pay for an item), a data access attempt (e.g., to access account-related content, to access account-related information, etc.), or another account-related action.

In some embodiments, the verification code may be generated based on account-related information. As an example, with respect to FIG. 1, security module subsystem 112 may generate a verification code associated with an account. For instance, security module subsystem 112 may enable access to one or more security modules. A security module may be a secure environment to generate and manage sensitive information, such as an on-premises hardware security module (HSM), a cloud-based HSM, or other security module. In some embodiments, the security module may manage one or more cryptographic keys (e.g., a public/private key pair, DES keys, a symmetric key, an asymmetric key, etc.). As an example, the security module may store the cryptographic keys in association with an account identifier to generate the verification code. As an example, in addition to the verification code being generated based on account-related information, the verification code may further be based on a cryptographic key associated with the account, where the cryptographic key is stored within the security module. Security module subsystem 112 may have access to a plurality of hardware security modules (e.g., hosted on computer system 102, etc.), or a plurality of cloud-based security modules (e.g., security modules hosted remotely from computer system 102, security modules hosted on client device 104, etc.). In some embodiments, the verification code may be generated based on the cryptographic key and an account identifier, an expiration date, location information, or other information associated with the account.

The verification code may be a secret code (e.g., integers, an alphanumeric string, a hexadecimal value, a binary value, a set of characters, etc.) that is generated via the security module based on account-related information and a cryptographic key (e.g., stored in the security module). In some scenarios, to protect the verification code and prevent nefarious users from obtaining the verification code (e.g., through a data breach), the account service provider may not store the verification code and may only generate the verification code when an account generation request or authentication request is received. For instance, when security module subsystem 112 generates the verification code, security module subsystem 112 may delete the verification code from memory. For example, the verification code may be deleted so that the verification code is not cached or otherwise stored in a data storage (e.g., account database(s) 138 or other databases) from which the verification code is retrievable. To maintain the security of the account, in some embodiments, the account service provider may provide the verification code to a user in a secure manner once generated where only the user has the verification code. As an example, the verification code may be printed and mailed to a user, cryptographically sent to the user, or otherwise provided to a user for safekeeping.

In a use case, with respect to transaction cards (e.g., payment cards, credit cards, debit cards, gift cards, etc.), a transaction card issuer (e.g., a bank, bank-related service, etc.) may be unable to store the verification code (e.g., card verification value (CVV)) in association with an account identifier (e.g., a primary account number (PAN), credit card number, debit card number, etc.). For example, due to the Payment Card Industry (PCI) standard, the CVV may not be stored in association with the PAN to increase transaction card security. Thus, the CVV may only be generated at runtime by a security module when an authentication request is received by the system and compared to a user-provided CVV. However, due to the processing power and availability limitations of security modules, long delays may occur with respect to authenticating an authorization request and may impact the user's experience while also backing up the security module with numerous authentication requests during high-volume times. To overcome these problems, security module subsystem 112 may generate an authentication code based on the verification code and store the authentication code in association with the account for processing one or more future authentication requests related to the account (e.g., to decrease authentication request delays associated with security module processing).

In some embodiments, when a security module is unavailable to process an authentication request (e.g., due to system downtime, a security module being unavailable, a security module having a long delay, etc.), an authentication code may be used to authenticate an authentication request to reduce authentication delays associated with security module processing. As an example, authentication subsystem 114 may generate the authentication code based on a verification code in the authentication request.

In some embodiments, the authentication code may be generated based on the verification code and account-related information (e.g., in the authentication request). For example, the authentication code may be generated based on the verification code, an identifier (e.g., an account identifier, an account username, a transaction card number, etc.), an expiration date, location information, or other account-related information. In some embodiments, the authentication code may be generated based on a hash-based algorithm (e.g., hash-based message authentication code algorithm) or other cryptographic hash function. For example, the hash-based algorithm may be an algorithm that takes a variable length input (e.g., the verification code and account-related information) and produces a fixed length output. As another example, the hash-based algorithm may be a SHA-1, SHA-2, or SHA-3 algorithm, including variants of each algorithm (e.g., SHA-256, SHA-512, SHA3-256, SHA3-512, etc.).

Figure 3:
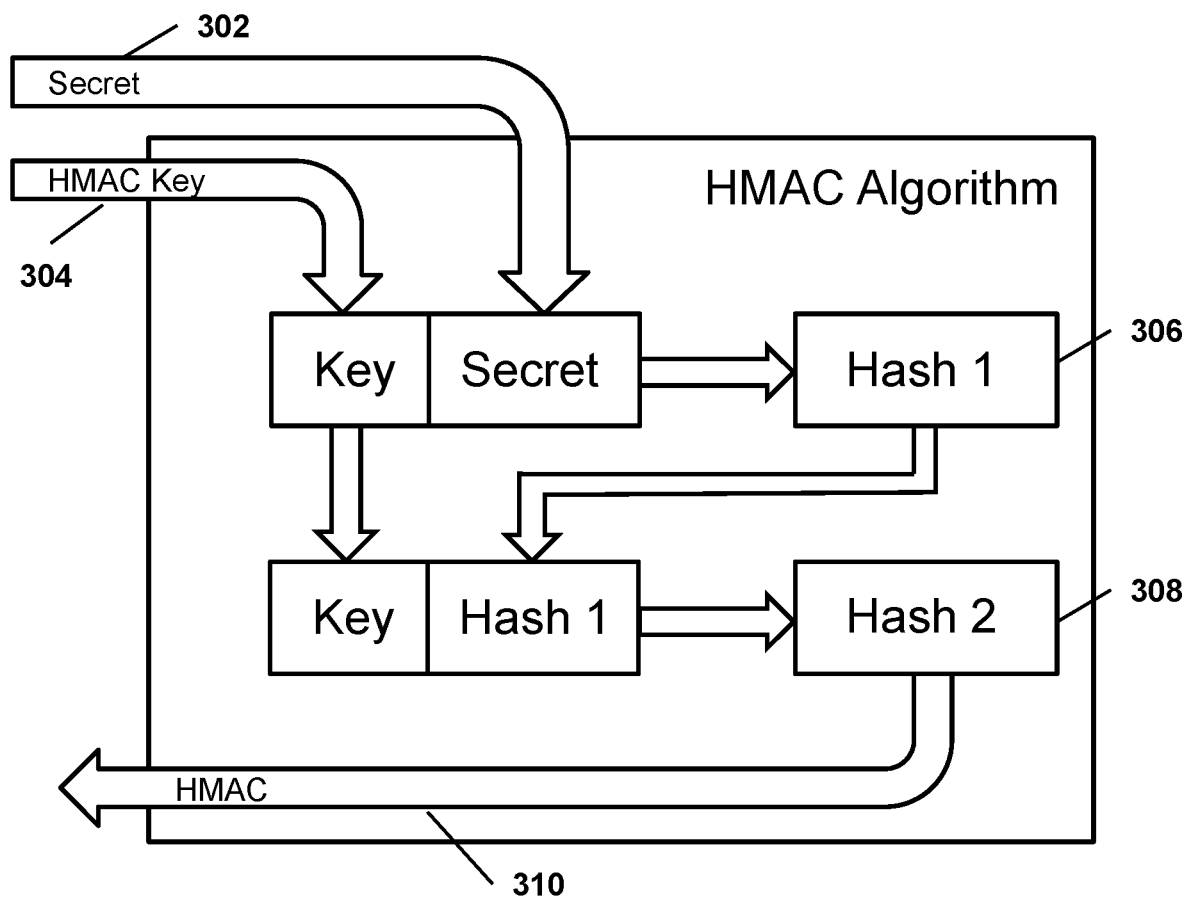
FIG. 3 shows an illustrative diagram of an algorithm configured to reduce authentication delays, in accordance with one or more embodiments.

Referring to FIG. 3, a hash-based message authentication code (HMAC) algorithm 300 is shown. In a use case, the HMAC algorithm may be used to generate the authentication code. For example, the HMAC algorithm may take a secret 302 and an HMAC key 304 as inputs and produce an HMAC 310 as output. In some embodiments, secret 302 may comprise partial secrets. For example, the partial secrets may be a set of alphanumeric strings, integers, hexadecimal values, binary values, or other values appended together. In some embodiments, the secret 302 may not be a set of partial secrets, but rather a single secret (e.g., an alphanumeric string, an integer, integers, a hexadecimal value, hexadecimal values, a binary value, binary values, etc.). The HMAC key 304 may be a cryptographic key associated with the account (e.g., stored in a security module where the cryptographic key is stored in association with account-related information). As an example, where secret 302 comprises partial secrets, a first partial secret may comprise an account identifier, an expiration date associated with the account identifier, a location (e.g., city, state, zip code, postal code, etc.) associated with the account, or other information associated with the account. A second partial secret may also be associated with the account identifier. For example, the second partial secret may include a verification code associated with the account. In some embodiments, the second partial secret may be generated via a security module (e.g., security module subsystem 112) based on the account identifier, the expiration date associated with the account, the location associated with the account, or the other information associated with the account. Authentication subsystem 114 may use HMAC algorithm 300 to generate an HMAC based on the first partial secret, the second partial secret, and an HMAC key associated with the account identifier.

For example, in some embodiments, HMAC algorithm 300 may append secret 302 and HMAC key 304 together to produce hash 306. Hash 306 may be a hash of secret 302 and HMAC key 304. HMAC algorithm 300 may then hash HMAC key 304 and hash 306 to produce hash 308. Once hash 308 is generated by HMAC algorithm 300, HMAC algorithm 300 may output hash 308 as the generated HMAC 310.

In a use case, with respect to transaction cards, the authentication code may be an HMAC. For example, authentication subsystem 114 may generate the HMAC based on HMAC algorithm 300. Authentication subsystem 114 may obtain account-related information via storage subsystem 116, such as an account identifier (e.g., a PAN) and an expiration date associated with the account. Authentication subsystem 114 may further obtain the verification code associated with the account via security module subsystem 112 as well as an HMAC key. Authentication subsystem 114 may generate the HMAC based on the PAN, expiration date, verification code, and HMAC key using HMAC algorithm 300. For example, the PAN, expiration date, and verification code may be secrets (e.g., partial secrets) that are combined together with the HMAC key and hashed to generate hash 306. Hash 308 may be generated based on hashing the combination of hash 306 and the HMAC key to generate HMAC 310. HMAC 310 may be stored in association with the account identifier (e.g., the PAN) in a manner that does not violate the PCI requirements while maintaining account security. Furthermore, by storing the HMAC in association with the account, the authentication code (e.g., HMAC 310) may be used to authenticate future authentication requests in an efficient manner by comparing the authentication code to another authentication code.

In some embodiments, storage subsystem 116 may store the authentication code in association with the account. In some embodiments, storage subsystem 116 may store the authentication code as part of the account-related information of the account in lieu of storing the verification code (e.g., due to the account service provider being prohibited from storing the verification code in association with the account). For example, storage subsystem 116 may store the authentication code as a part of the account information to easily retrieve the authentication code when authenticating an authentication request.

In some embodiments, authentication subsystem 114 may obtain an authentication request. For example, client device 104 may generate the authentication request, and authentication subsystem 114 may obtain an authentication request from client device 104. The authentication request may be a request to authenticate an action. The action may be an account-related action, such as a login attempt, a payment transaction, a data access attempt, or other account-related actions. In some embodiments, client device 104 may generate the authentication request to facilitate the login, the payment transaction, the data access, or the other actions. In some embodiments, the authentication request may include a user-provided verification code. For example, to authenticate the requested action, a user-provided verification code may be required to verify the identity of the user and ensure that the user is who they purport to be (e.g., due to only the user having access to the verification code generated during account generation).

In some embodiments, the authentication request may include the user-provided verification code and additional information. For example, the authentication request may include the user-provided verification code and an identifier (e.g., an account identifier), expiration date, location (e.g., city, state, zip code, etc.), or other account-related information. In one use case, the authentication request may be a payment request (e.g., to authorize a transaction, to authorize a transfer of funds, etc.). As an example, the user account may be a payment account, and a user may wish to purchase an item. Upon a user selecting an item to purchase, client device 104 may generate a payment request that may need to be authenticated by authentication subsystem 114 to complete the purchase. The payment request may include account-related information, such as a PAN, an expiration date associated with the user's account, location information, or other account-related information. In some embodiments, the PAN and expiration date may be printed on a transaction card that is associated with the user's account. The payment request may also include additional information, such as a user-provided verification code (e.g., a CVV), a purchase amount, or other additional information. In some embodiments, the verification code may be printed on the transaction card associated with the account. Since the verification code is printed on the transaction card, the verification code may help to verify the identity of the purported user. For instance, because the verification code is a secret that other users (e.g., nefarious users) should not be able to access, a user may include the verification code in the authentication request to establish their identity. Therefore, a user using client device 104 may send the payment request to an account service provider (e.g., a bank, transaction card issuer, etc.) to authenticate the authentication request.

In another use case, the authentication request may be a login request. For example, a user may want to log in to their account to perform one or more account-related actions or gain access to account-related information. The login request may be a request to verify a user's credentials associated with the user's account. The login request may include account-related information, such as an account identifier (e.g., a username, screenname, etc.), an expiration date associated with the account, or other account-related information. The login request may also include additional information such as a user-provided verification code. The login request may be sent to an account service provider (e.g., a website, company, etc.) to authenticate the user to gain access to account-related information, perform one or more actions associated with the account, or other account-related actions.

Figure 2:
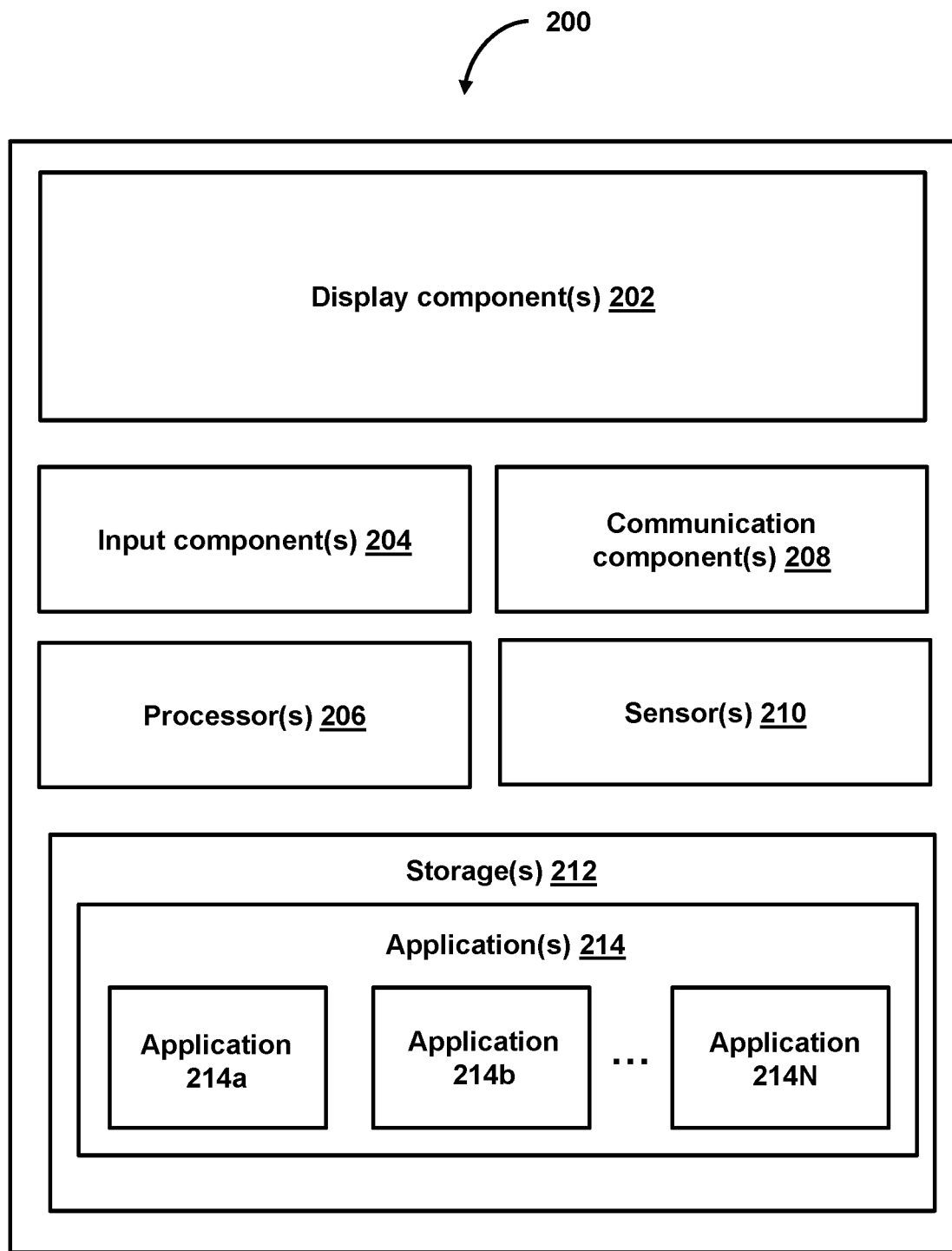
FIG. 2 shows a client device, in accordance with one or more embodiments.

In some embodiments, with respect to FIG. 2, one or more operations related to reducing authentication delays via security module processing may be performed by client device 200. In some embodiments, client device 200 may correspond to client device 104 (FIG. 1). Client device 200 may include a plurality of components, such as display component(s) 202, input component(s) 204, processor(s) 206, communication component(s) 208, sensor(s) 210, storage(s) 212, application(s) 214, or other components. In some embodiments, storage 212 may store a variety of applications. For example, applications 214a-214n may represent different applications stored on client device 200. As another example, application 214 may be an application that is associated with the account service provider. For instance, the account service provider may have a dedicated application configured as a user interface to allow a user to interact with one or more account services of the account service provider. For example, application 214 may be configured to allow a user to perform one or more account-related actions or other actions consistent with one or more embodiments.

In some embodiments, authentication subsystem 114 may generate a security module request. For example, the security module request may include a request for a security module response related to the second verification code. For instance, the security module request may seek security module processing (e.g., to authenticate the authentication request). For example, in response to authentication subsystem 114 receiving the authentication request, authentication subsystem 114 may generate the security module request and transmit the security module request to security module subsystem 112. Security module subsystem 112 may determine whether the security module is available to process the authentication request, whether there is a delay for processing the authentication request, how long the delay is, or whether the security module is currently unavailable. For example, if the delay satisfies a delay threshold (e.g., 1 second, 2 seconds, 3 seconds, 1 minute, 2 minutes, 3 minutes, 1 hour, 2 hours, 3 hours, etc.), authentication subsystem 114 may evoke one or more alternative techniques for processing the authentication request. In some embodiments, the delay may satisfy a delay threshold if the delay meets or exceeds the delay threshold.

In some embodiments, model subsystem 118 may determine that a system event occurred that is predicted to negatively impact the timeliness of the security module response. For instance, authentication subsystem 114 may generate the security module request, and before transmitting the request to security module subsystem 112, may interact with model subsystem 118 to predict whether a system event occurred that may negatively impact the timeliness of the security module response. For example, model subsystem 118 may use one or more machine learning models to predict whether events occurring on the computer system where the security module is hosted will impact the timeliness of the security module response.

In some embodiments, model subsystem 118 may train or configure one or more prediction models to facilitate one or more embodiments described herein. In some embodiments, such models may be used to predict authentication delays associated with security module processing. As an example, such models may be trained or configured to perform the foregoing functions by respectively mutually mapping input data and output data in nonlinear relationships based on learning (e.g., deep learning).

In some embodiments, the prediction models may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 4:
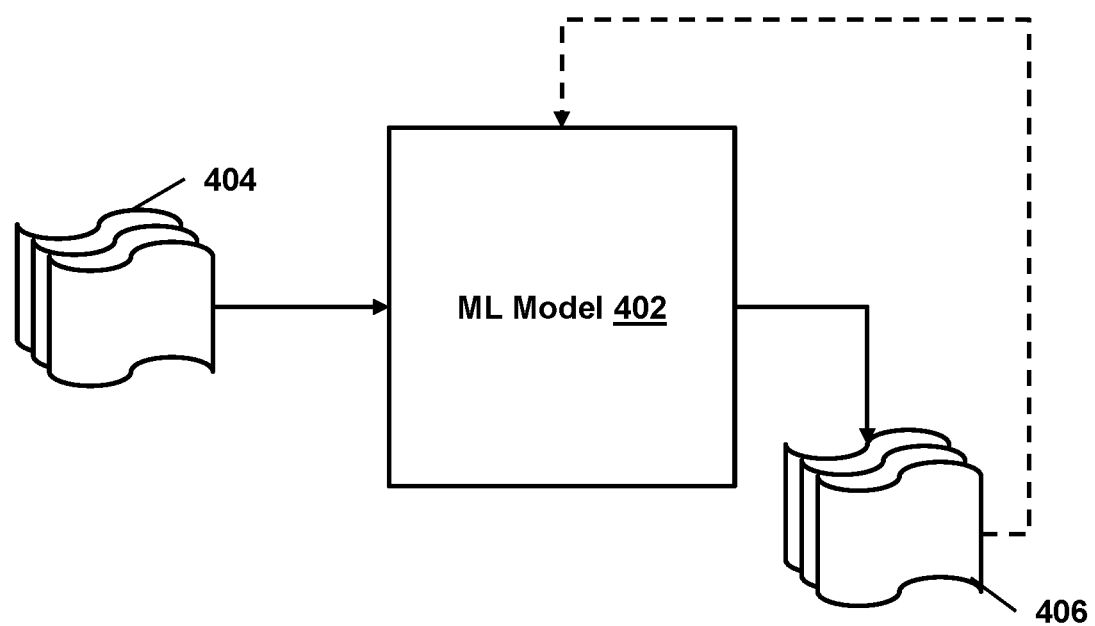
FIG. 4 shows a machine learning model configured to reduce authentication delays, in accordance with one or more embodiments.

As an example, with respect to FIG. 4, machine learning model 402 may take inputs 404 and provide outputs 406. In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

As another example, inputs 404 may include system events. For instance, system events may include events that have occurred on the system (e.g., computer system 102, client device 104, or other system-related components). The system events may include a system downtime alert with a level of severity (e.g., high severity, medium severity, low severity), a system failure alert, potential issues related to the system, one or more system-related issues, whether the system is available, whether the system is operating normally, or other system events. The system events may provide a status of the system that hosts the security module to determine a possible delay. As another example, inputs 404 may include other information such as how many security module requests are pending, how many security module requests are received, how many system components have transmitted a security module request, or other system-related information. Machine learning model 402 may take inputs 404 as input to the machine learning model 402 and provide outputs 406. In some embodiments, outputs 406 may represent a delay time associated with the system. For example, the outputs 406 may be a prediction of the length of a system delay (e.g., 1 second, 2 seconds, 3 seconds, 1 minute, 2 minutes, 3 minutes, 1 hour, 2 hours, 3 hours, 1 day, 2 days, 3 days, etc.). Machine learning model 402 may take outputs 406 as reference feedback to generate more accurate predictions. For example, machine learning model 402 may receive predictions related to a system delay and update one or more parameters associated with machine learning model 402. As another example, machine learning model 402 may compare outputs 406 to known outputs (e.g., based on inputs 402) and compute a difference between an output of outputs 406 to a known output.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may be input to the input layer in various forms, and in various dimensional forms, and may be input to respective nodes of the input layer of the neural network. In the neural network, nodes of layers other than the output layer are connected to nodes of a subsequent layer through links for transmitting output signals or information from the current layer to the subsequent layer, for example. The number of links may correspond to the number of nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure forward and backward connections may be provided. The links are also referred to as connections or connection weights, as referring to the hardware implemented connections or the corresponding "connection weights" provided by those connections of the neural network. During training and implementation such connections and connection weights may be selectively implemented, removed, and varied to generate or obtain a resultant neural network that is thereby trained and that may be correspondingly implemented for the trained objective, such as for any of the example recognition objectives described above.

In some embodiments, authentication subsystem 114 may generate a security module request. For example, authentication subsystem 114 may generate the security module request based on retrieved account-related information. The security module request may include account-related information, such as an account identifier, an expiration date associated with the account, location information associated with the account, or other information associated with the account. Security module subsystem 112 may generate an account-associated verification code (e.g., via an HSM) based on the security module request and compare the generated verification code to a user-provided verification code (e.g., in the authentication request) to authenticate an account-related action or other account-related event.

In a use case, the authentication request is a payment request, and the payment request may include account-related information, such as a PAN, an expiration date, location information, or other account-related information. The payment request may also include additional information such as a user-provided verification code. Authentication subsystem 114 may generate a security module request, where the security module request includes the PAN, expiration date, location information, or other account-related information. Security module subsystem 112 may obtain the security module request and generate an account-associated verification code. For example, security module subsystem 112 may access an HSM to generate the account-associated verification code based on the security module request. For instance, the account-associated verification code may be generated based on the same (or similar) information used to originally generate a user-provided verification code. In this way, once the account-associated verification code is generated by the HSM, security module subsystem 112 may compare the account-associated verification code to the user-provided verification code. For example, security module subsystem 112 may determine whether the account-associated verification code corresponds to the user-provided verification code via a matching of the verification codes. Based on the verification codes matching, security module subsystem 112 may delete the account-associated verification code from memory to ensure user account security. In some embodiments, based on the verification codes matching, security module subsystem 112 may generate an authentication response to the authentication request indicating that the authentication request (e.g., payment request) is authenticated (e.g., approved, accepted, etc.). In some embodiments, based on the verification codes not matching, security module subsystem 112 may generate an authentication response to the authentication request indicating that the authentication request is not authenticated (e.g., denied, rejected, etc.).

In some embodiments, authentication subsystem 114 may generate another authentication code based on a user-provided verification code. For instance, authentication subsystem 114 may generate the other authentication code via a hash-based algorithm. As an example, the hash-based algorithm may be the same algorithm used to generate a pre-stored authentication code (e.g., the HMAC algorithm as shown in FIG. 3, or other hash-based algorithm). The other authentication code may be based on the same (or similar) information as the pre-stored authentication code in an attempt to produce a matching authentication code.

In some embodiments, the other authentication code may be generated based on the user-provided verification code. For example, authentication subsystem 114 may use a hash-based algorithm (e.g., HMAC algorithm 300) to generate the other authentication code based on the user-provided verification code. In some embodiments, the other authentication code may be generated based on the user-provided verification code and account-related information. For example, authentication subsystem 114 may generate the other authentication code based on the user-provided verification code, an identifier (e.g., an account identifier, an account username, an account number, etc.), an expiration date, location information, the HMAC key (or other cryptographic key), or other account-related information. For instance, the other authentication code may be generated based on the same (or similar) information as the pre-stored authentication code. Alternatively, in some embodiments, the other authentication code may be generated by client device 104. As an example, the client device 104 may handle the generation of the other authentication code and may provide the other authentication code to authentication subsystem 114 to authenticate the authentication request.

In one use case, where the user account is associated with a payment account, the other authentication code may be generated based on the user-provided verification code. For example, where the authentication request is a payment request, the payment request may include account-related information such as the PAN, expiration date, location information, or other account-related information. Additionally, the payment request may also include additional information such as the user-provided verification code (e.g., a CVV). Authentication subsystem 114 may generate the other authentication code using the same hash-based algorithm as the pre-stored authentication code. For example, authentication subsystem 114 may use HMAC algorithm 300 to generate the other authentication code based on the PAN, expiration date, location information, the CVV, and an HMAC key. Subsequent to authentication subsystem 114 generating the other authentication code, authentication subsystem 114 may determine whether the other authentication code corresponds to the pre-stored authentication code. For example, the other authentication code may correspond to the pre-stored authentication code based on a matching between the two authentication codes. In this way, utilization of computer resources is reduced while maintaining an increased level of security by generating and comparing the authentication codes to one another. For instance, the level of security is increased by using the HMAC algorithm, where any minor change to the inputs (e.g., the account-related information) will produce a different authentication code. Additionally, because the authentication codes are compared to one another to determine whether user-provided account information is indeed correct (e.g., the PAN, expiration date, location information, verification code, etc.), minimal computer resources are required as the comparison may be based on a simple string matching. Furthermore, by using the hash-based algorithm, the reliance of a security module is not required to authenticate data and may decrease authentication times where a security module is unavailable or is associated with a long delay time.

In some embodiments, authentication subsystem 114 may generate the other authentication code based on the determination that a system event occurred that will delay the security module response. For example, authentication subsystem 114 may receive an indication that the security module is unavailable to process the authentication request, that a security module delay satisfies a delay threshold, that the computer system hosting the security module is unavailable, or that an event occurred that negatively impacts the timeliness of the security module response. In one scenario, security module subsystem 112 or model subsystem 118 may provide authentication subsystem 114 an indication that the security module is unavailable. Thus, to reduce authentication delays associated with security module processing, authentication subsystem 114 may generate the other authentication code to determine whether the pre-stored authentication code corresponds to the other authentication code. In this way, the system does not need to wait for a security module to become available to authenticate an authentication request, but rather may securely authenticate the authentication request based on a match between the pre-stored authentication code and the other authentication code.

In some embodiments, authentication subsystem 114 may provide an authentication response for the authentication request. For example, authentication subsystem 114 may provide an authentication response for the authentication request based on a determination that the other authentication code corresponds to the pre-stored authentication code. The authentication response may include an indication of whether the authentication request is authenticated or not authenticated (e.g., approved or denied). For example, authentication subsystem 114 may determine whether the pre-stored authentication code corresponds to the other authentication code. For instance, in some embodiments, authentication subsystem 114 may compare the authentication codes to one another and determine whether the authentication codes match. If there is a match, authentication subsystem 114 may generate an authentication response for the authentication request indicating that the authentication request is authenticated. If the authentication codes do not match, authentication subsystem 114 may generate an authentication response indicating that the authentication request is not authenticated. For example, the authentication response may include an indication that the authentication request is approved, denied, authenticated, not authenticated, or other response. In some embodiments, the authentication response may be a message that is provided to the sender of the authentication request. As an example, where client device 104 transmits the authentication request, authentication subsystem 114 may transmit the authentication response to client device 104.

In some embodiments, providing the authentication response may be based on a determination that (i) a delay related to the security module response satisfies a delay threshold and (ii) the second authentication code corresponds to the first authentication code. For example, authentication subsystem 114 may receive an indication that a security module is unavailable, or that a security module response may be delayed that satisfies a delay threshold. In addition, the authentication response may be provided to the sender of the authentication request based on the currently generated authentication code corresponding to the pre-stored authentication code. In this way, the system may reduce authentication delays associated with security module processing by providing an authentication response based on the authentication codes corresponding to one another due to a security module processing delay.

Example Flowcharts

Figure 5:
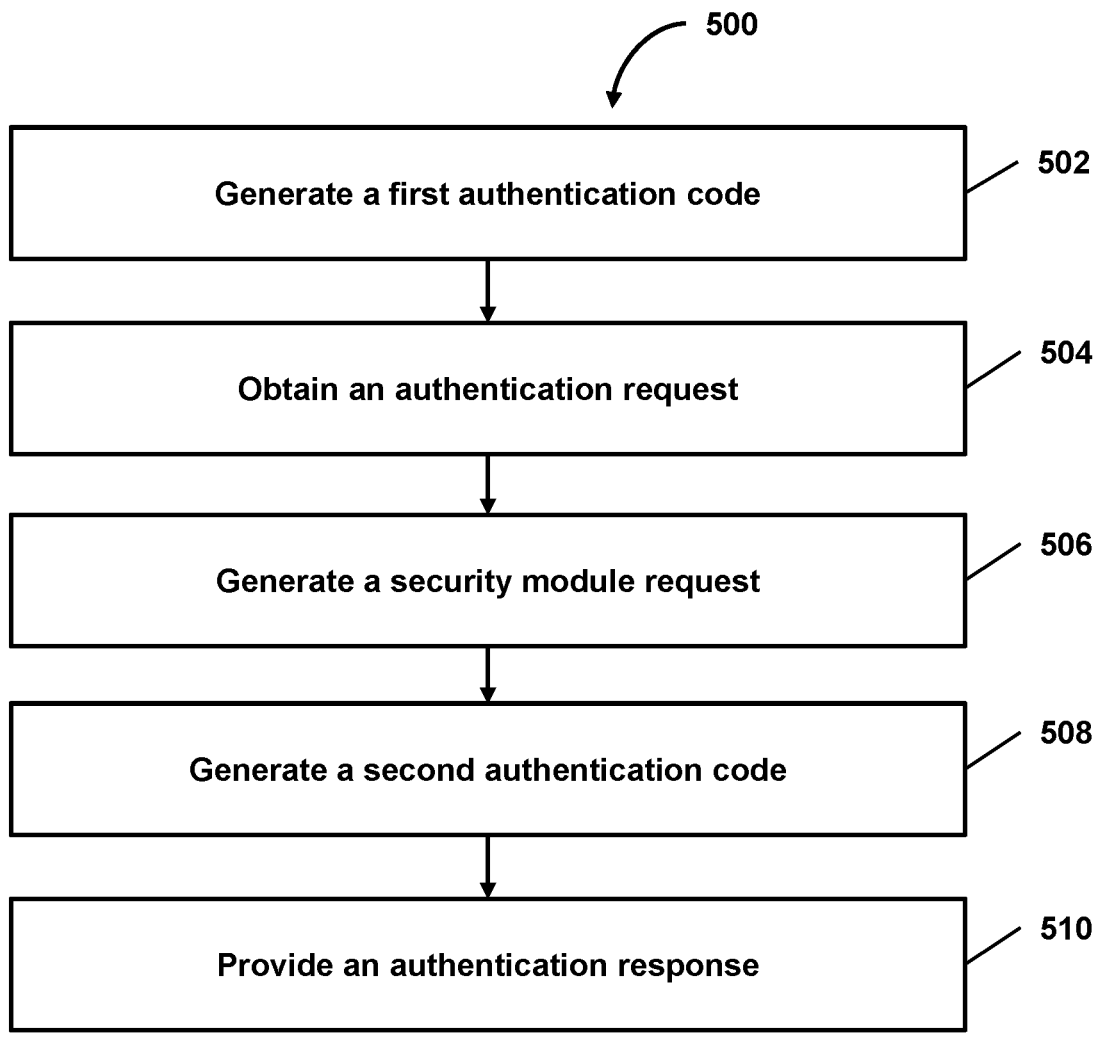
FIG. 5 shows a flowchart of a method of reducing authentication delays, in accordance with one or more embodiments.

FIG. 5 is an example flowchart of processing operations of a method 500 that enable the various features and functionality of the system as described in detail above. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 502, a first authentication code may be generated. For example, the first authentication code may be generated based on a first verification code associated with an account. As another example, the first verification code may be generated by a security module (e.g., an HSM or other security module). In some embodiments, the first authentication code may be generated based on a hash-based algorithm. Operation 502 may be performed by a subsystem that is the same as or similar to authentication subsystem 114, in accordance with one or more embodiments.

In an operation 504, an authentication request may be obtained. For example, the authentication request may include a request to authenticate an action (e.g., a login attempt, a payment transaction, a data access attempt, etc.). In some embodiments, the authentication request may include a user-provided verification code. Operation 504 may be performed by a subsystem that is the same as or similar to authentication subsystem 114, in accordance with one or more embodiments.

In an operation 506, a security module request may be generated. For example, the security module request may include a request for a security module response related to the second verification code. For instance, the security module request may be a request for a security module to provide an account-associated verification code for comparison to the second verification code in the authentication request. Operation 506 may be performed by a subsystem that is the same as or similar to authentication subsystem 114, in accordance with one or more embodiments.

In an operation 508, a second authentication code may be generated. For example, the second authentication code may be generated based on the second verification code. In some embodiments, the second verification code may be a user-provided verification code. Additionally, in some embodiments, the second authentication code may be generated based on a hash-based algorithm. Operation 508 may be performed by a subsystem that is the same as or similar to authentication subsystem 114, in accordance with one or more embodiments.

In an operation 510, an authentication response may be provided. For example, the authentication response may be provided based on a determination that the second authentication code corresponds to the first authentication code. In some embodiments, the second authentication code may correspond to the first authentication code based on a matching between the authentication codes. Operation 510 may be performed by a subsystem that is the same as or similar to authentication subsystem 114, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132, which may include training data database(s) 134, model database(s) 136, account database(s) 138, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically store information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: generating a first authentication code based on a first verification code associated with an account; storing the first authentication code in association with the account; obtaining an authentication request to authenticate an action, the authentication request comprising a second verification code; generating a security module request for a security module response related to the second verification code; generating a second authentication code based on the second verification code; and providing an authentication response for the authentication request based on a determination that the second authentication code corresponds to the first authentication code.
2. The method of the preceding embodiment, wherein providing the authentication response comprises providing the authentication response for the authentication request based on a determination that (i) a delay related to the security module response satisfies a delay threshold and (ii) the second authentication code corresponds to the first authentication code.
3. The method of any of the preceding embodiments, wherein providing the authentication response comprises providing the authentication response for the authentication request based on a determination that (i) a computer system hosting a security module (e.g., to which the security module request was transmitted) is unavailable and (ii) the second authentication code corresponds to the first authentication code.
4. The method of any of the preceding embodiments, wherein generating the second authentication code comprises generating the second authentication code further based on a determination that (i) the second authentication code corresponds to the first authentication code and (ii) the delay satisfies the delay threshold, the computer system hosting the security module is unavailable, or an event occurred that is predicted to negatively impact the timeliness of the security module response.
5. The method of any of the preceding embodiments, wherein generating the first authentication code comprises generating the first authentication code based on the first verification code and an identifier, expiration date, location (e.g., city, state, zip code, etc.), or other information associated with the account.

6. The method of any of the preceding embodiments, wherein the authentication request comprises the second verification code and an identifier, expiration date, location (e.g., city, state, zip code, etc.), or other information associated with the account.
7. The method of any of the preceding embodiments, further comprising: deleting the first verification code from memory (e.g., such that the first verification code is not cached or otherwise stored in a data storage from which the first verification code is retrievable by the system that generated the first authentication code or obtained the authentication request).
8. The method of any of the preceding embodiments, wherein the first authentication code is stored in association with the account (e.g., in association with an identifier of the account) in lieu of storing the first verification code.
9. The method of any of the preceding embodiments, wherein the verification code is generated by one or more security modules (e.g., a hardware security module or other security modules) based on an identifier associated with the account, expiration date, location (e.g., city, state, zip code, etc.), or other information associated with the account.
10. The method of any of the preceding embodiments, further comprising: obtaining a first partial secret, the first partial secret comprising an identifier, expiration date, location (e.g., city, state, zip code, etc.), or other information associated with the account; and obtaining, from one or more security modules (e.g., a hardware security module or other security modules), a second partial secret associated with the account, wherein the second partial secret is generated by the hardware security module based on the identifier, the expiration date, the location, or the other information associated with the account.
11. The method of any of the preceding embodiments, wherein generating the first authentication code comprises generating, via a hash-based message authentication code (HMAC) technique, the first authentication code based on the first verification code and an identifier, expiration date, location (e.g., city, state, zip code, etc.), or other information associated with the account.
12. A tangible, non-transitory, machine-readable medium storing instructions that, when executed by a data processing apparatus, cause the data processing apparatus to perform operations comprising those of any of the foregoing method embodiments.
13. A system comprising: one or more processors; and memory storing instructions that, when executed by the processors, cause the processors to effectuate operations comprising those of any of the foregoing method embodiments.

What is claimed is:

1. A system for reducing authentication delays related to hardware security module processing, the system comprising:
one or more processors programmed with computer program instructions that, when executed, cause operations comprising:
storing, in association with an account identifier, a first authentication code to authenticate future actions, the first authentication code being generated, via a hash-based message authentication code (HMAC) technique, based on hashing (i) a first partial secret comprising the account identifier and an expiration date associated with the account identifier, (ii) a second partial secret derived by a hardware security module (HSM) using the account identifier and the expiration date, and (iii) a HMAC key associated with the account identifier;
obtaining an authentication request to authenticate an action associated with the account identifier, the authentication request comprising the account identifier, the expiration date, and a user-provided card verification code different from the HMAC key;
generating an HSM request for the HSM to provide an HSM response related to the user-provided card verification code; and
in response to determining that the HSM's an HSM-derived delay of the HSM in providing the HSM response exceeds a delay threshold:
generating, via the HMAC technique, a second authentication code based on hashing (i) the account identifier of the authentication request, (ii) the expiration date of the authentication request, (iii) the user-provided card verification code of the authentication request, and (iv) the HMAC key; and
providing an authentication response for the authentication request, indicating that the action is authenticated, based on the second authentication code matching the first authentication code.

2. The system of claim 1, wherein providing the authentication response comprises providing the authentication response for the authentication request based on a determination that (i) a computer system hosting the hardware security module is unavailable and (ii) the second authentication code matches the first authentication code.

3. The system of claim 1, wherein the HMAC technique comprises an HMAC-SHA256 or HMAC-SHA3-512 algorithm.

4. A method comprising:
storing, in association with an account, a first authentication code to authenticate future actions, the first authentication code being generated, via a hashing technique, based on hashing (i) a first partial secret comprising an account identifier associated with the account and an expiration date associated with the account, (ii) a second partial secret derived by a security module using the account identifier and the expiration date, and (iii) a key associated with the account identifier;
subsequent to storing the first authentication code, obtaining an authentication request to authenticate an action associated with the account, the authentication request comprising the account identifier, the expiration date, and a verification code;
generating a security module request for the security module to provide a security module response related to the verification code of the authentication request;
determining that a security-module-derived delay of the security module in providing the security module response satisfies a delay threshold and that a second authentication code corresponds to the first authentication code, wherein the second authentication code is generated, via the hashing technique, based on hashing (i) the account identifier of the authentication request, (ii) the expiration date of the authentication request, (iii) the verification code of the authentication request, (iv) and the key; and
providing an authentication response for the authentication request based on the determination that (i) the security-module-derived delay of the security module in providing the security module response satisfies the delay threshold and (ii) the second authentication code corresponds to the first authentication code.

5. The method of claim 4, wherein determining that the security module's delay in providing the security module response satisfies the delay threshold is based on the security module's delay exceeding the delay threshold.

6. The method of claim 4, wherein generating the second authentication code is further based on a determination that a computer system hosting the security module is unavailable, or an event occurred that is predicted to negatively impact a timeliness of the security module response.

7. The method of claim 4, wherein the first authentication code is stored in association with the account in lieu of storing the second partial secret.

8. The method of claim 4, wherein the first partial secret further comprises location information associated with the account and wherein the second partial secret is generated by the security module based on the identifier, the expiration date, and the location information associated with the account.

9. The method of claim 4, wherein generating the first authentication code is based on a hash-based message authentication code (HMAC) technique.

10. The method of claim 9, wherein the HMAC technique comprises an HMAC-SHA256 or HMAC-SHA3-512 algorithm.

11. One or more non-transitory computer-readable media comprising instructions that, when executed by one or more processors, cause operations comprising:
    storing, in association with an account, a first authentication code to authenticate future actions, the first authentication code being generated, via a hashing technique, based on hashing (i) a first partial secret comprising an account identifier associated with the account, (ii) a second partial secret derived by a security module using the account identifier, and (iii) a key associated with the account identifier;
    subsequent to storing the first authentication code, obtaining an authentication request to authenticate an action associated with the account, the authentication request comprising the account identifier and a verification code;
    generating a security module request for the security module to provide a security module response related to the verification code;
    determining that a security-module-derived delay of the security module in providing the security module response satisfies a delay threshold and that a second authentication code corresponds to the first authentication code, wherein the a second authentication code is generated, via the hashing technique, based on hashing (i) the account identifier of the authentication request, (ii) the verification code of the authentication request, and (iii) the key; and
    providing an authentication response for the authentication request based on the determination that (i) the security-module-derived delay of the security module in providing the security module response satisfies the delay threshold and (ii) the second authentication code corresponds to the first authentication code.

12. The non-transitory computer-readable media of claim 11, wherein determining that the delay related to the security module providing the security module response satisfies the delay threshold is based on the delay exceeding the delay threshold.

13. The non-transitory computer-readable media of claim 11, wherein generating the second authentication code is further based on a determination that the a computer system hosting the security module is unavailable, or an event occurred that is predicted to negatively impact a timeliness of the security module response.

14. The non-transitory computer-readable media of claim 11, wherein generating the first authentication code comprises generating the first authentication code further based on an expiration date associated with the account and location information associated with the account.

15. The non-transitory computer-readable media of claim 11, wherein the authentication request further comprises an expiration date associated with the account and location information associated with the account.

16. The non-transitory computer-readable media of claim 11, wherein the operations further comprise:
    deleting the security-module-generated verification code from memory.

17. The non-transitory computer-readable media of claim 11, wherein the first authentication code is stored in association with the account in lieu of storing the security-module-generated verification code.

18. The non-transitory computer-readable media of claim 11, wherein the security-module-generated verification code is generated by one or more security modules based on an identifier associated with the account, an expiration date associated with the account, or location information associated with the account.

19. The non-transitory computer-readable media of claim 11, wherein generating the first authentication code is based on a hash-based message authentication code (HMAC) technique.

20. The non-transitory computer-readable media of claim 19, wherein the HMAC technique comprises an HMAC-SHA256 or HMAC-SHA3-512 algorithm.

* * * * *